United States Patent [19]
Russell

[11] 3,808,932
[45] May 7, 1974

[54] SAW GUARD
[75] Inventor: Ben C. Russell, Albermarle, N.C.
[73] Assignee: Stanley Fixture Manufacturing Company, Incorporated, Norwood, N.C.
[22] Filed: Feb. 23, 1973
[21] Appl. No.: 335,143

[52] U.S. Cl.................... 83/478, 83/860, 83/440.2, 83/546
[51] Int. Cl....................... B27g 19/02, B23d 59/00
[58] Field of Search .......... 83/860, 440.2, 478, 544, 83/546, 102.1

[56] References Cited
UNITED STATES PATENTS
2,711,762  6/1955  Gaskell............................ 83/860 X
2,810,408  10/1957  Boice et al......................... 83/478 X
3,754,493  8/1973  Niehaus et al........................ 83/478

Primary Examiner—Donald R. Schran
Attorney, Agent, or Firm—Bean & Bean

[57] ABSTRACT

A guard for table mounted circular saws or the like including a saw guard bracket assembly supported for selective vertical and horizontal movements relative to the saw and for conjunctive tilting movements with the saw relative to the table.

10 Claims, 6 Drawing Figures

SAW GUARD

SUMMARY OF THE INVENTION

The present invention is directed towards a novel guard for protecting an operator from engagement with that portion of a power driven circular saw or other cutter projecting above the surface of a table, bench or like work support.

Specifically, the saw guard of the present invention includes a standard fixed for conjunctive tilting movement with the saw relative to the table, a first member carried adjacent the top of the standard for horizontal movements relative thereto, a second member carried adjacent the forward end of the first member for vertical movements relative thereto, and a saw guard bracket assembly fixedly carried by the lower end of the second member. The bracket assembly is formed at least in part of a transparent material in order to permit visual inspection of the saw and the workpiece being operated upon.

The first member is movably connected to the standard by means of a roller bearing carrying first traveler received within a horizontally disposed essentially U-shaped first guide rail fixed to the standard. In a like manner, the second member is movably connected to the first member by means of a roller bearing carrying second traveler received within a vertically disposed, essentially U-shaped second guide rail fixed to the first member. Locks in the form of set screws are provided for releasably locking the members and thus the bracket assembly in desired positions.

DRAWINGS

The nature and mode of the present invention will now be more fully described in the following detailed description taken with the accompanying drawings wherein:

FIG. 5 is a sectional view taken generally along line 5—5 in FIG. 3; and

FIG. 6 is a sectional view taken generally along line 6—6 in FIG. 3.

DETAILED DESCRIPTION

Figure 1:
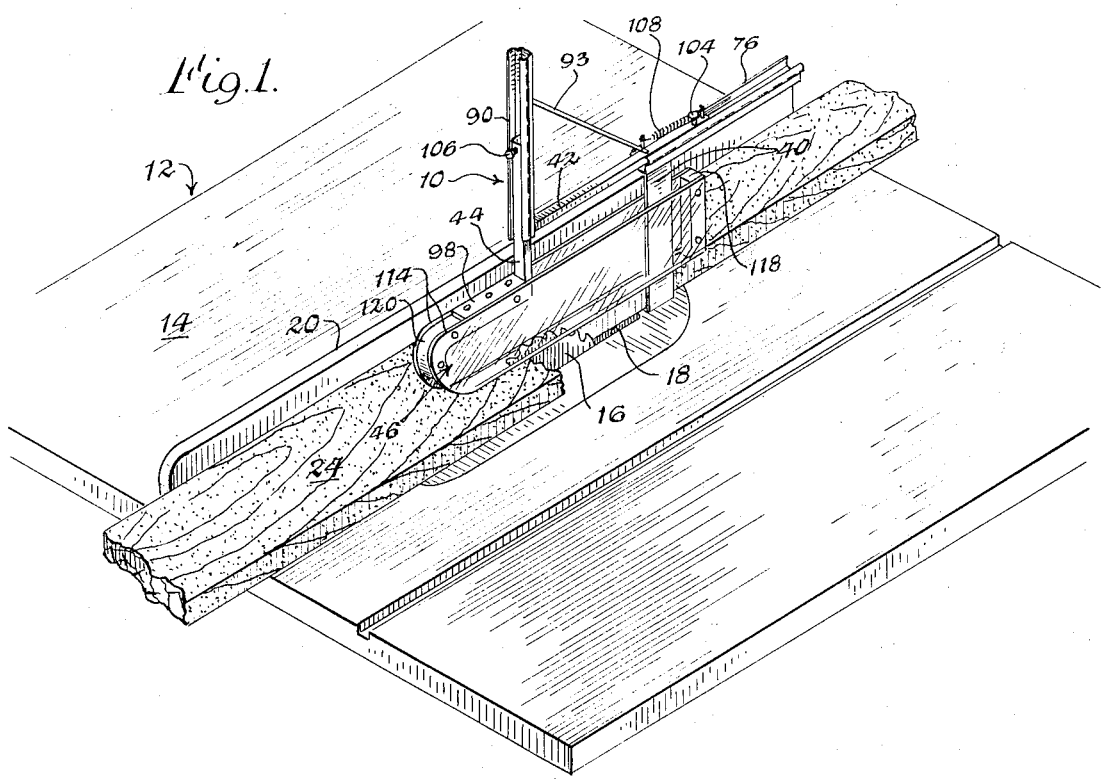
FIG. 1 is a perspective view of the saw guard of the present invention associated with a table saw set up to perform a ripping operation.
Figure 2:
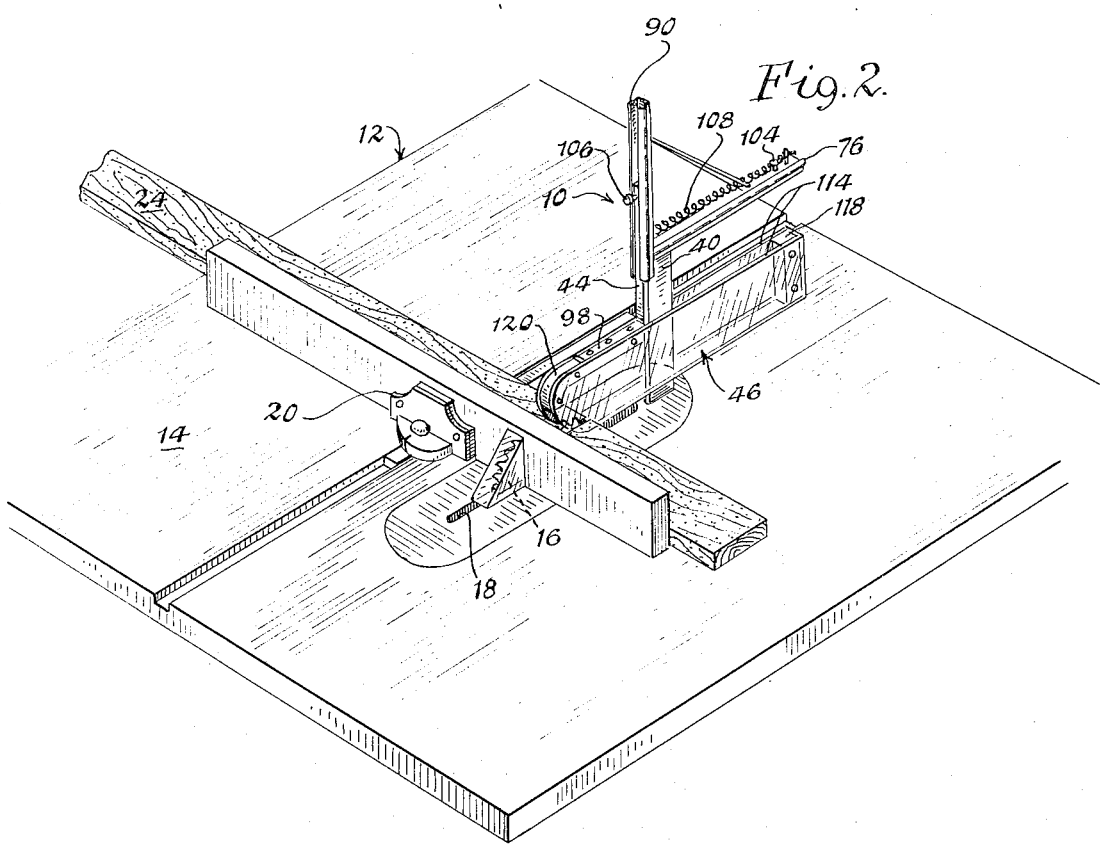
FIG. 2 is a perspective view similar to FIG. 1, but showing the table saw set up to perform a cross cutting operation.
Figure 3:
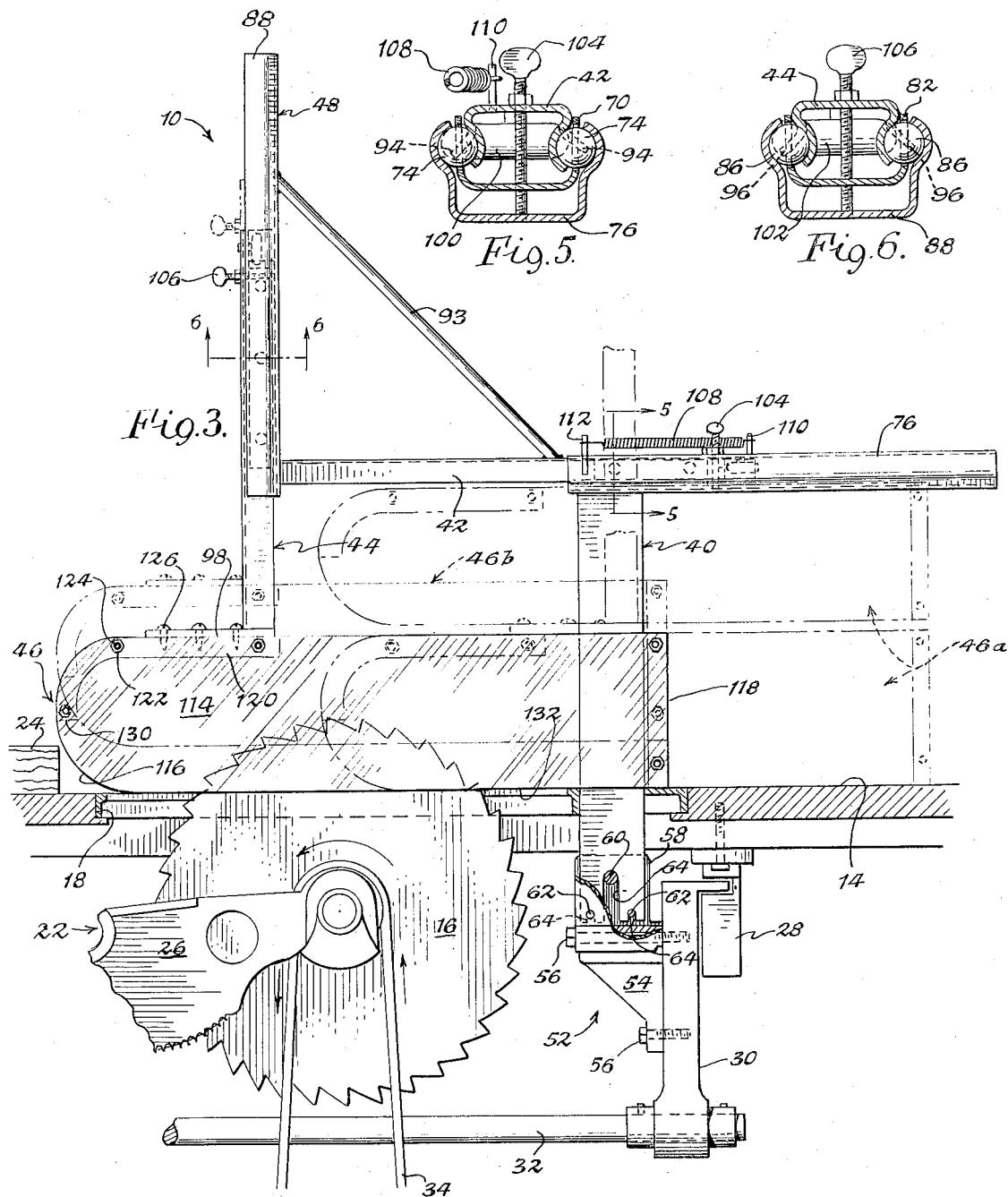
FIG. 3 is an elevational view of the saw guard showing the manner in which it is fixed for conjunctive tilting movement with the saw.

Reference is now made particularly to FIG. 1, wherein the saw guard of the present invention is generally designated as 10 and shown as being used in combination with a conventional table saw unit 12. For purposes of reference, unit 12 is shown in FIGS. 1–3 as including a flat table top 14; a circular saw 16, which projects upwardly through a table top slot opening 18; a workpiece guide assembly 20; and a saw mounting assembly 22. Guide assembly 20 is conveniently mounted on the upper surface of table top 14 for movement relative to saw 16 between at least the positions shown in FIGS. 1 and 2 in order to permit both ripping and cross cutting operations to be formed on a wood board or other workpiece 24. Assembly 22 generally includes a bracket 26 for journaling saw 16 and permitting vertical adjustments thereof relative to table top 14; a table top mounted hanger device 28; and a bracket 30, which is movably suspended by hanger device 28 and interconnected with bracket 26 for conjunctive movements by a connector 32 in order to permit selective tilting of the plane of rotation of the saw in opposite directions, as required to perform beveled or miter cuts. Saw 16 may be suitably driven as by an electric motor, not shown, via a drive belt 34.

Saw guard 10 is shown in FIGS. 1–4 as generally including a thin metal plate standard 40; an essentially U-shaped first member 42, which is carried adjacent the top of standard 40 for horizontal reciprocating movements; an essentially U-shaped second member 44, which is carried adjacent the forward end of first member 42 for vertical reciprocating movements; and a saw guard assembly 46, which is fixed to depend from adjacent the lower end of second member 44 in a straddling relationship relative to saw 16.

In accordance with the present invention, standard 40 is removably fixed to bracket 30 by a conventional saw guard mounting device 52, such that it upstands above table top 14 rearwardly of saw 16 and lies within the plane of rotation of the saw. More specifically, device 52 is shown in FIG. 3, as including a first part 54, which is affixed to bracket 30 by threaded bolts 56, and a second part 58, which is affixed to part 54 by a threaded bolt 60; one or both of parts 54 and 58 carrying a pair of guide pins 62, which, together with bolt 60, are adapted to be removably received within three guide or positioning slots 64 opening downwardly through the lower end of standard 40. Standard 40 may be removably clamped between parts 54 and 58 by merely tightening bolt 60. When saw guard 10 is associated with a conventional table saw in this manner, standard 40 upstands above the table top rearwardly of the saw and lies within the plane of saw rotation; and members 42 and 44 and assembly 46 are mounted for movements within the plane of rotation of the saw. Preferably, the thickness of standard 40 is equal to or less than the width of cut formed by the teeth of the saw.

More specifically, reference is now made to FIGS. 3–6, wherein member 42 is shown as being movably connected to standard 40 by a first connector arrangement including an essentially U-shaped first traveler 70, which is formed with apertures 72 for the purpose of journaling a plurality of ball bearings 74, and an essentially U-shaped first guide rail 76, which is fixed to extend horizontally and rearwardly from adjacent the top of standard 40. As best shown in FIG. 5, when member 42, traveler 70 and guide rail 76 are assembled, bearings 72 are disposed within traveler apertures 72 and received within races or grooves 78 and 80 formed in facing legs of member 42 and guide rail 76, respectively. In a like manner, second member 44 is movably connected to the front end of member 42 by a second connector arrangement including an essentially U-shaped second traveler 82, which is formed with apertures 84 for journaling a plurality of ball bearings 86, and an essentially U-shaped second guide rail 88, which is fixed to extend vertically from adjacent a forward end of first member 42. When member 44, traveler 82 and guide rail 88 are assembled, bearings 86 are disposed within traveler apertures 84 and received within races or grooves 90 and 92 formed in facing legs of second member 44 and second guide rail 88, respectively. Preferably, a strut 93 is end connected, as by welding, to member 42 and guide rail 88 for the purpose of maintaining same in a right angular relationship.

Rearwardly disposed portions of legs 78 of first member 42 are cut away to define a pair of stop tabs 94, which cooperate with second guide rail 88 to define the limits of movement of traveler 70 lengthwise of member 42, whereas upwardly disposed portions of legs 90 are cut away to define a pair of stop tabs 96, which co-operate with a saw guard assembly mounting bracket 98 for the purpose defining the limits of movement of traveler 82 lengthwise of second member 44.

Members 42 and 44 are also preferably provided with guide rollers 100 and 102 arranged for rolling engagement with one of the legs of guide rails 76 and 88, respectively; and latch devices in the form of set screws 104 and 106 arranged to engage against the connecting flanges of rails 76 and 88, respectively, for releasably retaining members 42 and 44 in desired positions relative to their associated guide rails. When the latch devices are inoperative, the weight of member 44 at assembly 46 is employed to bias same downwardly into engagement with the top surface of table top 14, as indicated in full line in FIG. 3; and a spring device, such as a coil spring 108 end connected to first member and first guide rail mounted pins 110 and 112, respectively, is employed to bias member 42 into a first or normal forward position, also as shown in full line in FIG. 3.

Figure 4:
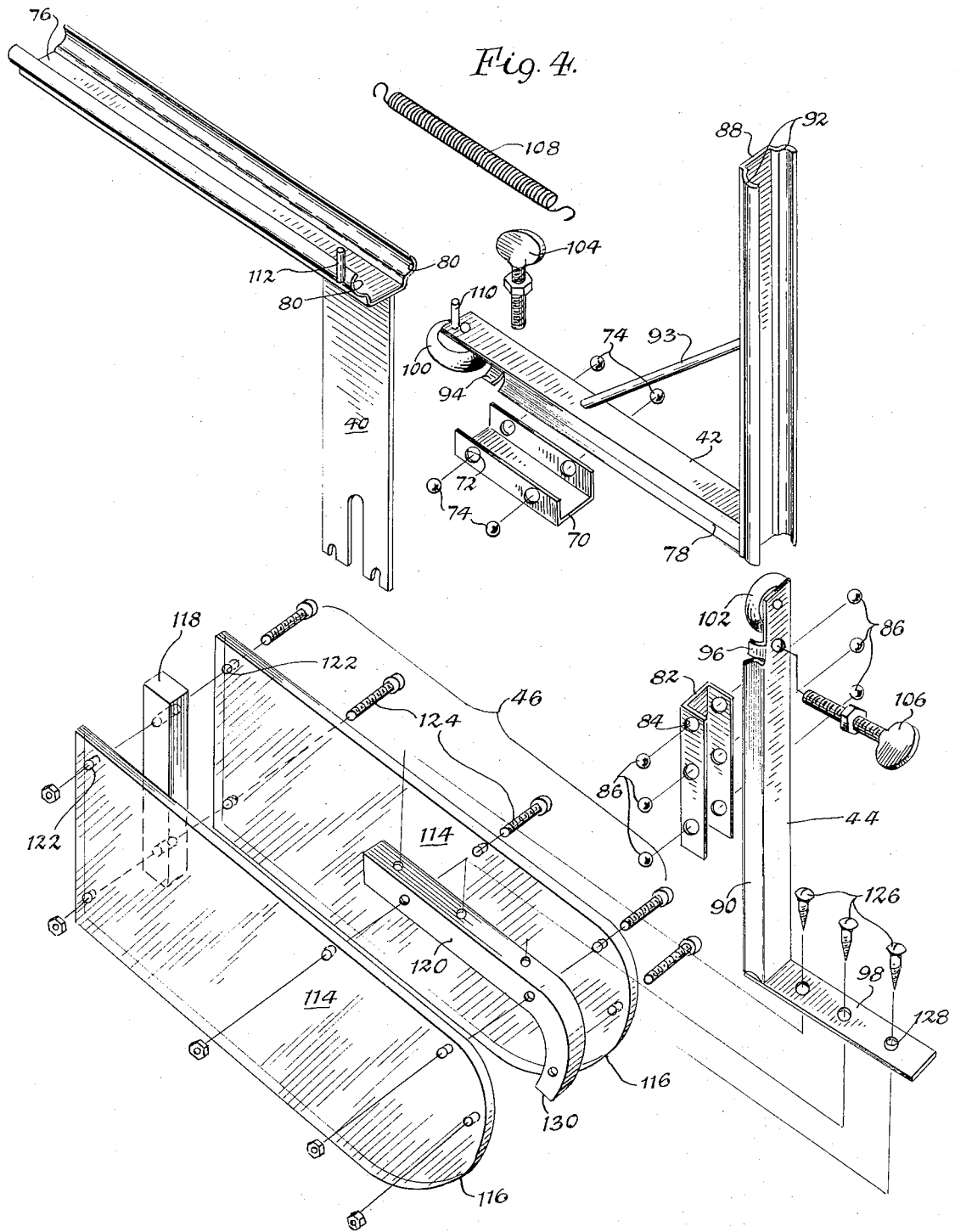
FIG. 4 is an enlarged exploded view of the saw guard.

Referring to FIGS. 1–4, it will be seen that assembly 46 includes a pair of generally rectangular side plates 114, which are preferably formed of a plastic transparent material and shaped to define upwardly and forwardly curved front end cam edge surfaces 116; and horizontally spaced rear and front spacer blocks 118 and 120, respectively. As best shown in FIG. 4, plates 114, block 118 and block 120 are formed with apertures 122 through which bolt devices 124 are passed in order to clamp the assembly together with plates 116 disposed in a spaced parallel relationship. Assembly 46 is affixed to the lower end of second member 144, by passing screw devices 126 downwardly through apertures 128 formed in flange 98 and into front spacer block 120. It will be understood that the lower front end 130 of front spacer block 120 is spaced from the lower edge surfaces 132 of side plates 114 by a distance sufficient to permit the front spacer block to clear the teeth of saw 16, when the saw is in a fully raised position and assembly 46 is moved into its rearmost position designated as 46a in FIG. 3.

By again referring to FIGS. 1 and 3, it will be understood that when saw guard 10 is mounted on the table saw unit, side plates 114 are arranged essentially parallel to and adjacent opposite sides of saw 16 and standard 40; the standard freely extending upwardly through assembly 46 between spacer blocks 118 and 120. Thus, with set screw 104 released, spring 108 tends to bias rear spacer block 118 forwardly into engagement with the rearwardly facing edge surface of standard 40 to determine the above mentioned normal forward position of member 42 and thus assembly 46. The above mentioned rearmost position of member 42 and thus assembly 46 may be various determined, as for example by engagement of front spacer block 120 with the forwardly facing edge surface of standard 40 or by engagement of the rearwardly disposed surface of second guide rail 88 with the front end of first guide rail 76. In either case, in its rearmost position the front end of assembly 46 is disposed immediately adjacent the rear of a mid point of saw 16, that is, a vertically disposed plane passing through the rotational axis of the saw.

When it is desired to perform a cross cutting operation on a workpiece, as shown in FIG. 2, set screws 104 and 106 are released in order to permit free vertical and horizontal movements of assembly 46. Thus, when a workpiece is moved towards the saw by assembly 20, engagement of the workpiece with front edge surfaces 116 forces assembly 46 to move upwardly against the force of gravity into an elevated position determined by the thickness of the workpiece, as for instance into a position designated as 46b in FIG. 3. Preferably, the spring force of spring 108 is sufficient to prevent rearwardly directed movement of assembly 46 such that the workpiece merely moves beneath the assembly in sliding engagement with the side plate lower edge surfaces 132. After the guide assembly 20 engages the front of assembly 46, assembly 46 is forced to move against the bias of spring 108 into its rearmost position at the completion of the sawing operation as indicated in FIG. 2. When the severed workpiece is removed from adjacent the saw and guide assembly 20 moved towards the front of the saw table, spring 108 and the force of gravity serve to return assembly 46 to its normal solid line position shown in FIG. 3. The extent of upward movement of assembly 46 and thus the thickness of a workpiece which may be processed may be variously determined, as for example by engagement of the assembly with the lower surface of first guide rail 76 or by engagement of bracket 98 with the lower end of second guide rail 88.

When a ripping operation is to be performed on a workpiece, as illustrated in FIG. 1, set screw 104 is tightened downwardly onto guide rail 76 in order to positively prevent movement of assembly 46 rearwardly from its normal forward position and thus insure that the assembly is maintained in protective overlying relationship relative to the saw at all times. Also, during ripping operation for which guide assembly 20 must be arranged immediately adjacent saw 16, set screw 106 may be employed to lock assembly 46 at an elevated position sufficient to prevent interference with the guide assembly.

I claim:

1. A guard for circular saw or the like cutting device projecting upwardly through a table, said guard comprising in combination:

a standard upstanding above said table rearwardly of said saw and lying within the plane of rotation of said saw;

a first member;

first connector means for connecting said first member to an upper end of said standard for horizontal reciprocating movements relative thereto and within said plane;

a second member;

second connector means for connecting said second member to a forwardly extending end of said first member for vertical reciprocating movements relative thereto and within said plane; and a saw guard assembly fixed to and depending from adjacent a lower end of second member for conjunctive movement therewith, and said assembly vertically straddling said saw.

2. The guard according to claim 1, wherein said table is characterized as including supporting means for said saw permitting tilting of the plane of rotation thereof relative to a top surface of said table, and a lower end of said standard is fixed to said supporting means for conjunctive tilting movement with said saw.

3. The guard according to claim 1, wherein said first member includes first latch means for releasably retaining said first member in at least one position relative to said standard.

4. The guard according to claim 3, wherein said second member includes second latch means for releasably retaining said second member in at least one position relative to said first member.

5. The guard according to claim 1, wherein said first connector includes a first guide rail fixed to extend horizontally and rearwardly from adjacent said upper end of said standard and means for mounting said first member on said first guide rail for movement lengthwise thereof, said second connector means includes a second guide rail fixed to extend upwardly from adjacent said forwardly extending end of said first member and means for mounting said second member on said second guide rail for movement lengthwise thereof.

6. The guard according to claim 5, wherein said assembly includes a pair of side plates formed from a transparent material and front and rear horizontally spaced spacer blocks for maintaining said side plates essentially parallel to and adjacent opposite sides of said saw and said standard, said standard freely upstanding between said side plates intermediate said spacer blocks.

7. The guard according to claim 6, wherein biasing means are provided to normally bias said assembly forwardly relative to said standard into a forward position determined by engagement of said rear spacer block with a rear edge surface of said standard, said assembly when in said forward position extending forwardly and rearwardly of said saw, the horizontal spacing between said spacer blocks being sufficient to permit rearwardly directed movement of said assembly against said bias into a rearmost position wherein a forward end of said assembly is disposed rearwardly of a vertical plane passing through the axis of rotation of said saw.

8. The guard according to claim 5, wherein said first member and said first guide rail are of essentially U-shaped configuration and arranged with the legs thereof disposed in facing relationship, said means for mounting said first member includes a first traveler of essentially U-shaped configuration having legs thereof apertured to journal a plurality of associated ball bearings and disposed intermediate facing leg portions of said first member and said first guide rail, said first member and said first guide rail being formed with lengthwise extending grooves to receive said first traveler associated ball bearings whereby to support said first traveler for lengthwise directed movement relative to each of said first member and said first guide rail and movably interconnect said first member with said first guide rail, and said second member and said second guide rail are of essentially U-shaped configuration and arranged with the legs thereof disposed in facing relationship, said means for mounting said second member includes a second traveler of essentially U-shaped configuration having legs thereof apertured to journal a plurality of associated ball bearings and disposed intermediate facing leg portions of said second member and said second guide rail, said second member and said second guide rail being formed with lengthwise extending grooves to receive said second traveler associated ball bearings whereby to support said second traveler for lengthwise directed movement relative to each of said second member and said second guide rail and movably interconnect said second member with said second guide rail.

9. The guard according to claim 8, wherein said assembly includes a pair of side plates formed from a transparent material and front and rear horizontally spaced spacer blocks for maintaining said side plates essentially parallel to and adjacent opposite sides of said saw and said standard, said standard freely upstanding between said side plates intermediate said spacer blocks, and biasing means are provided to normally bias said assembly forwardly relative to said standard into a forward position determined by engagement of said rear spacer block with a rear edge surface of said standard, said assembly when in said forward position extending forwardly and rearwardly of said saw, the horizontal spacing between said spacer blocks being sufficient to permit rearwardly directed movement of said assembly against said bias into a rearmost position wherein a forward end of said assembly is disposed rearwardly of a vertical plane passing through the axis of rotation of said saw.

10. The guard according to claim 9, wherein each of said first and second members carry set screws releasably engageable with said first and second guide rails for releasably latching said first and second members against movement relative thereto.

* * * * *